(12) United States Patent
Chauhan et al.

(10) Patent No.: US 11,801,720 B2
(45) Date of Patent: Oct. 31, 2023

(54) DISPLACEABLE TOW HOOK

(71) Applicant: Rivian IP Holdings, LLC, Plymouth, MI (US)

(72) Inventors: Akshat Chauhan, Livonia, MI (US); Vignesh Sekar, Canton, MI (US)

(73) Assignee: Rivian IP Holdings, LLC, Plymouth, MI (US)

( * ) Notice: Subject to any disclaimer, the term of this patent is extended or adjusted under 35 U.S.C. 154(b) by 288 days.

(21) Appl. No.: 17/201,447

(22) Filed: Mar. 15, 2021

(65) Prior Publication Data

US 2022/0288984 A1    Sep. 15, 2022

(51) Int. Cl.
| | | |
|---|---|---|
| *B60D 1/02* | (2006.01) | |
| *B60D 1/56* | (2006.01) | |
| *B60D 1/48* | (2006.01) | |
| *B60D 1/18* | (2006.01) | |
| *B60D 1/58* | (2006.01) | |

(52) U.S. Cl.
CPC ............... *B60D 1/56* (2013.01); *B60D 1/02* (2013.01); *B60D 1/187* (2013.01); *B60D 1/48* (2013.01); *B60D 1/565* (2013.01); *B60D 1/583* (2013.01)

(58) Field of Classification Search
CPC .......... B60D 1/56; B60D 1/565; B60D 1/187; B60D 1/02; B60D 1/243; B60D 1/48; B60D 1/583
See application file for complete search history.

(56) References Cited

U.S. PATENT DOCUMENTS

| | | | | |
|---|---|---|---|---|
| 7,472,919 B2 * | 1/2009 | Pratt | ...................... | B60D 1/485 |
| | | | | 280/495 |
| 8,678,423 B1 * | 3/2014 | Hwang | ................... | B60R 19/34 |
| | | | | 280/505 |
| 9,914,332 B2 * | 3/2018 | Jordan | ..................... | B60D 1/52 |

* cited by examiner

*Primary Examiner* — Kevin Hurley
*Assistant Examiner* — Marlon A Arce
(74) *Attorney, Agent, or Firm* — Clements Bernard Walker; Christopher L. Bernard

(57) ABSTRACT

Disclosed embodiments include apparatuses, vehicles, and methods for a displaceable tow hook. In an illustrative embodiment, an apparatus includes a tow hook configured to extend from a surface of a vehicle in a first direction. The tow hook includes a receiving section configured to receive a towing line and a securing section configured to extend away from the receiving section. A positioning mount is configured to secure the tow hook to the surface of the vehicle and to release the tow hook in response to an impinging force on the tow hook in excess of a predetermined threshold. A load-bearing structure is configured to mechanically connect the securing section to a structural component of the vehicle. The tow hook and the load-bearing structure are configured to support a force having a component in the first direction that is at least equal to the towing weight of the vehicle.

13 Claims, 9 Drawing Sheets

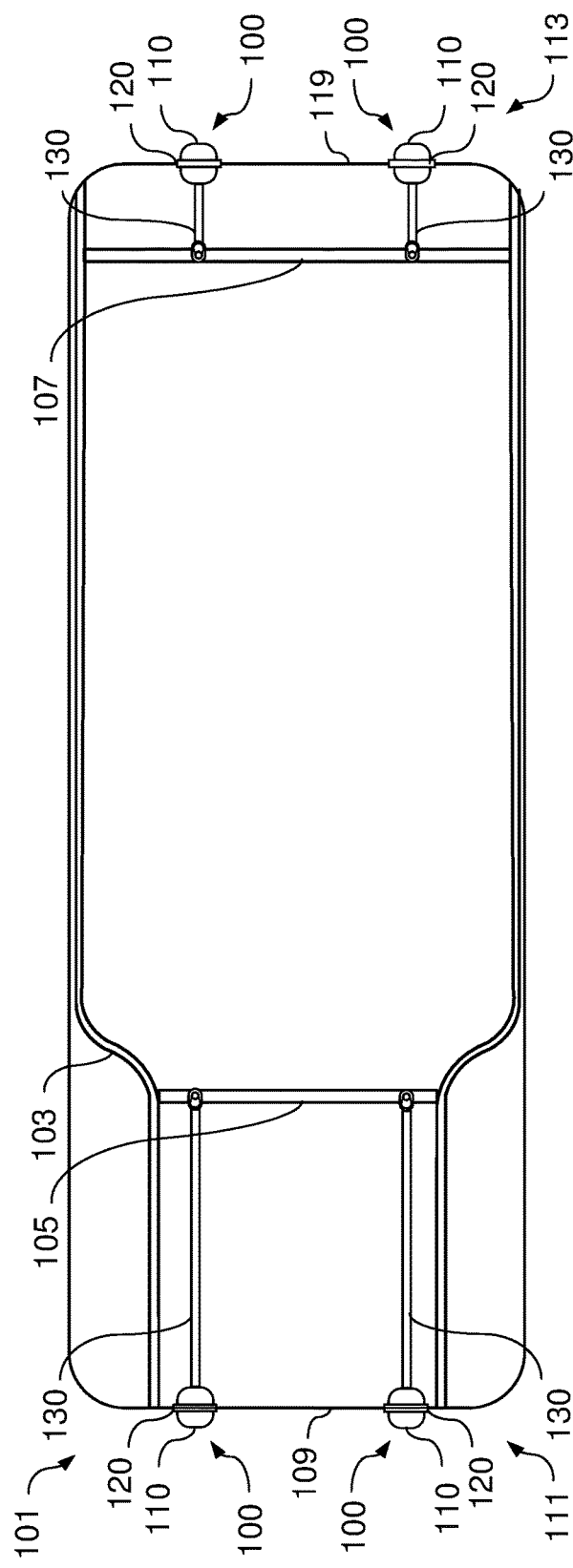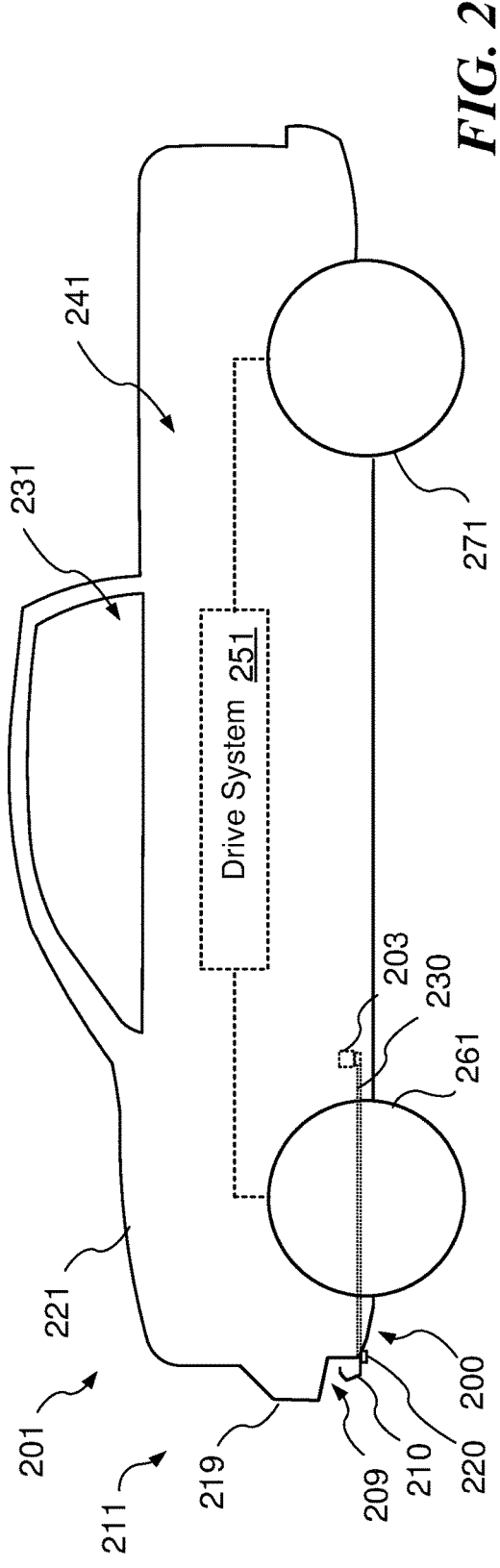

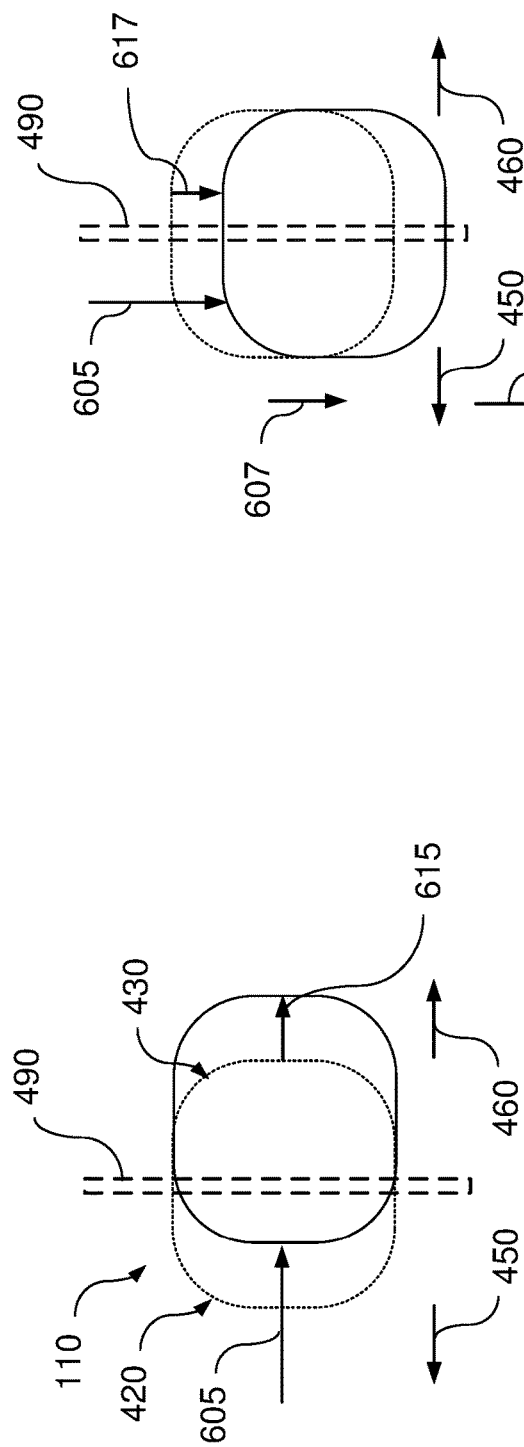
FIG. 6A
FIG. 6B
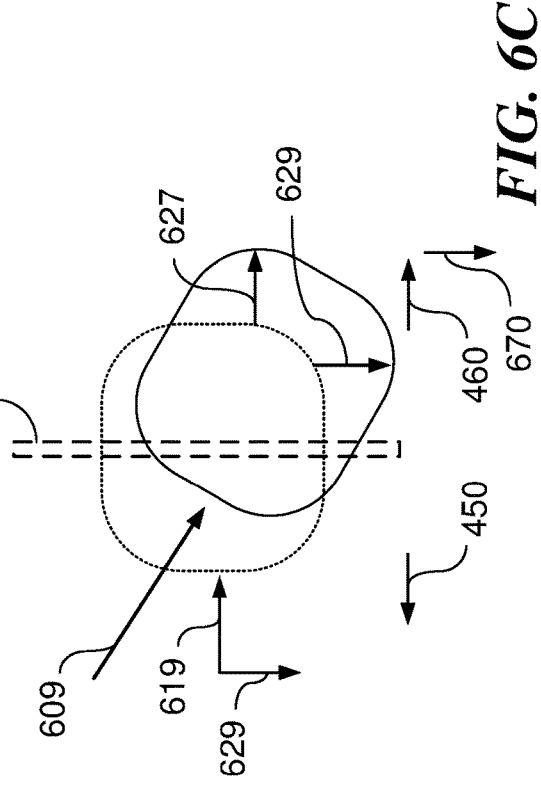
FIG. 6C

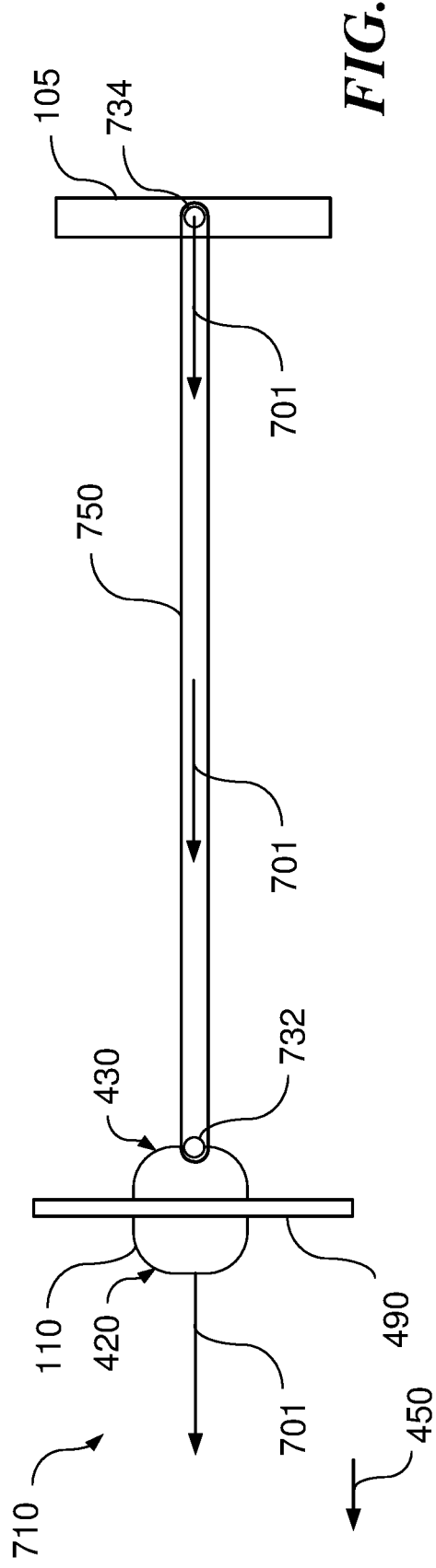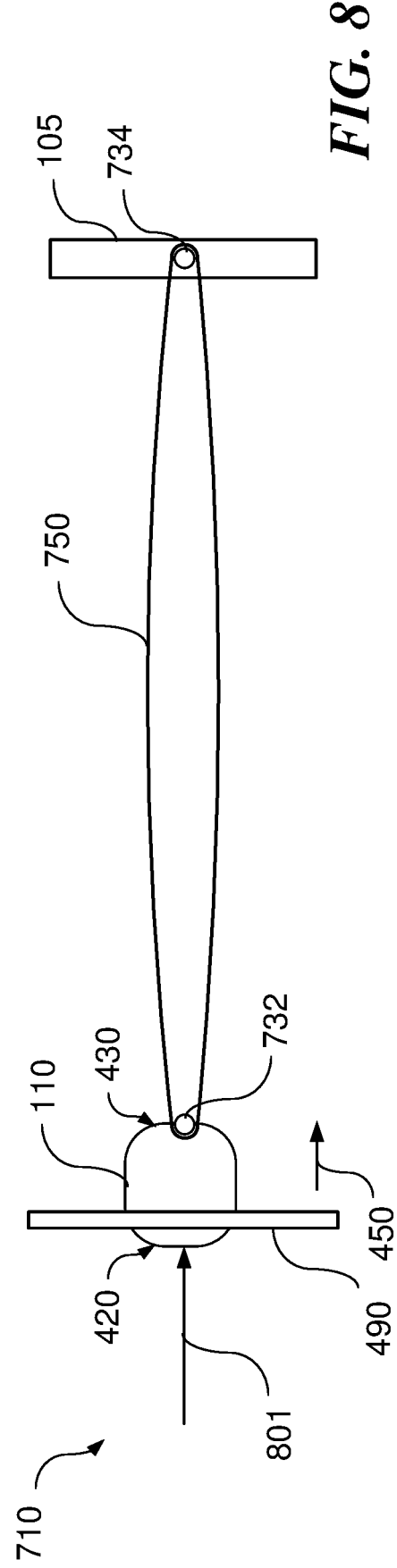

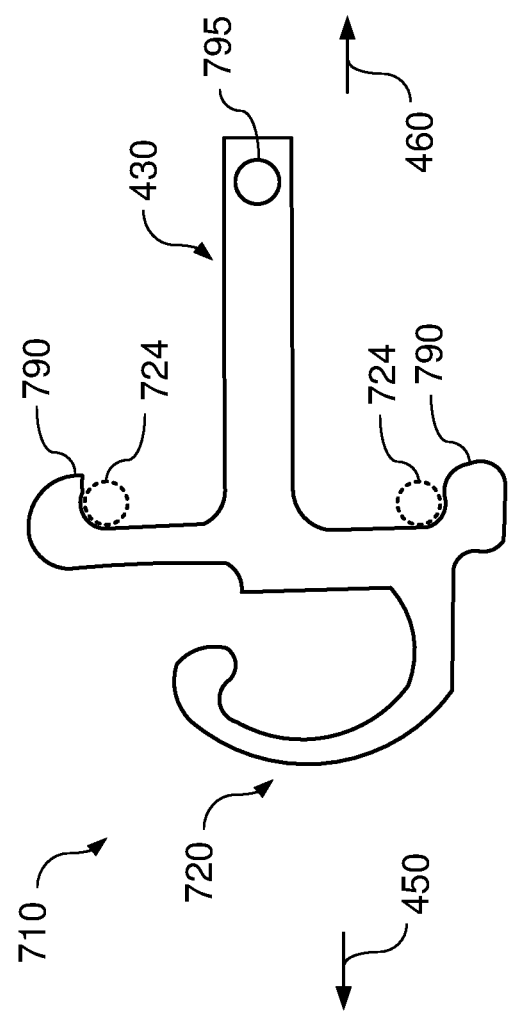

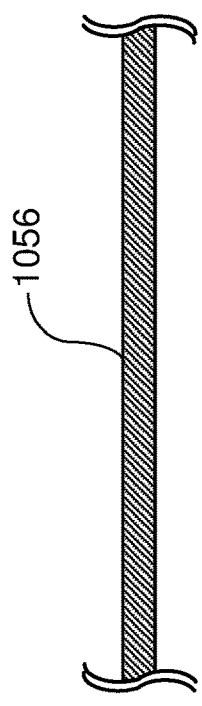
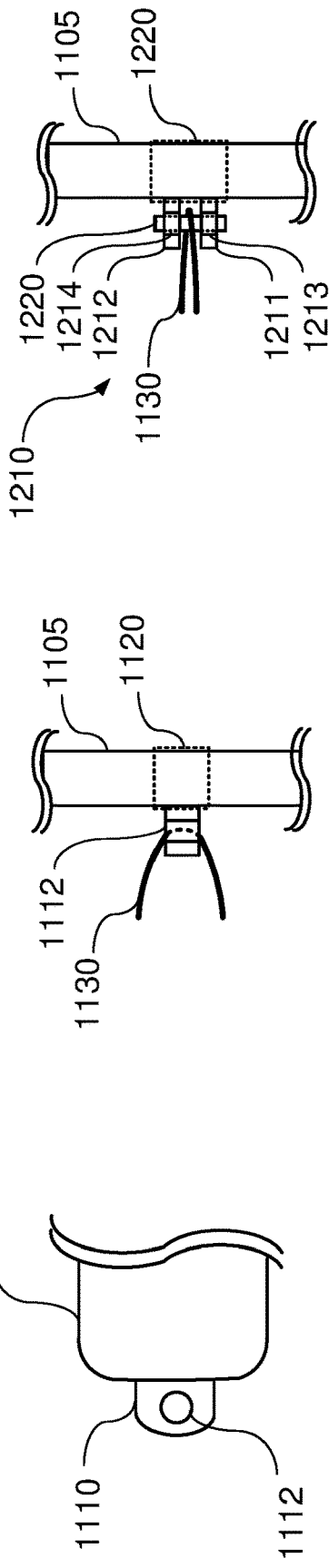

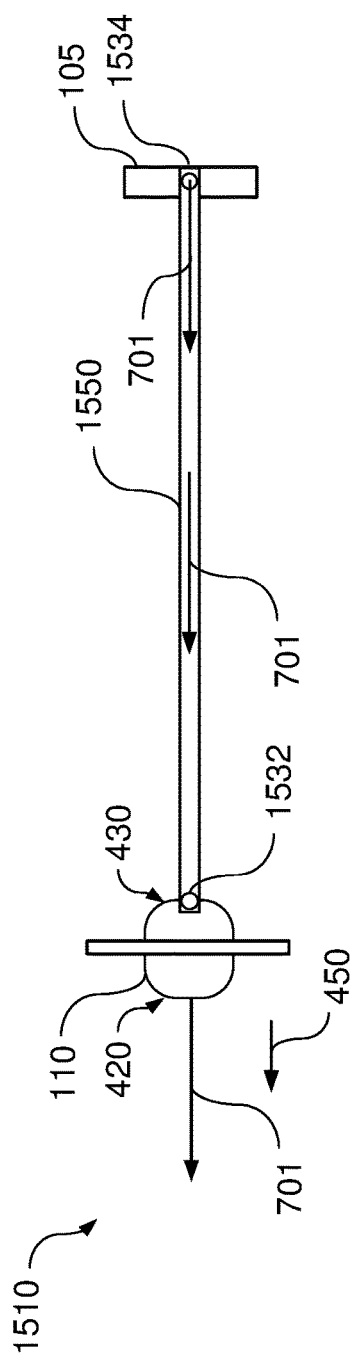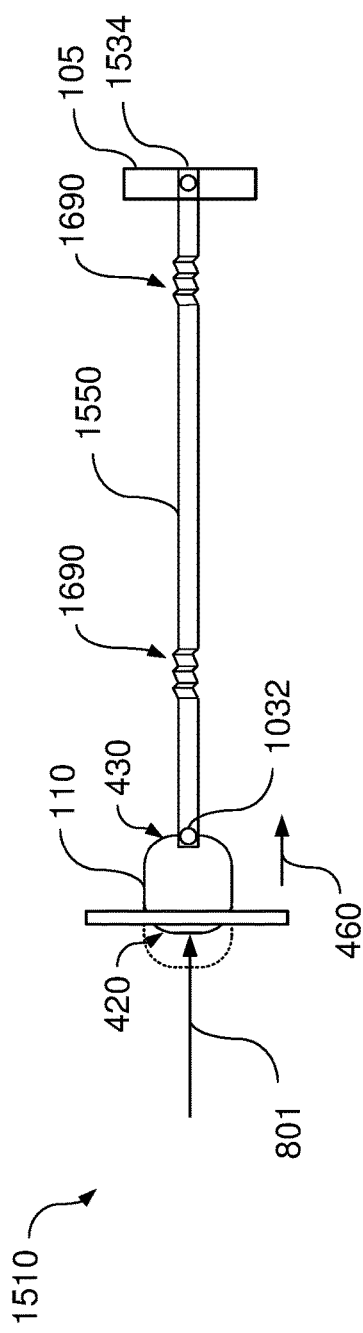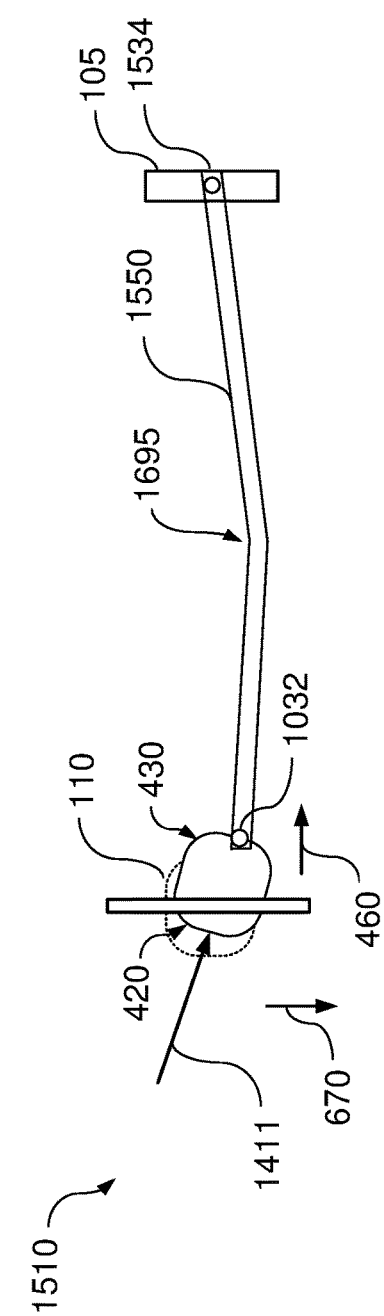

DISPLACEABLE TOW HOOK

INTRODUCTION

The present disclosure relates to a tow hook for a vehicle.

The statements in this section merely provide background information related to the present disclosure and may not constitute prior art.

Trucks, sport-utility vehicles, and other motorized vehicles may include tow hooks. Tow hooks are typically mounted to a front bumper or other front-facing surface or to a rear bumper or other rear-facing surface of the vehicle. Each of the tow hooks is configured to receive a tow line or other cable. Thus, for example, with a first end of one or more tow lines secured to the tow hooks and a second end attached to a towing vehicle, the tow hooks may enable the vehicle to be towed. For another example, with the first end of one or more tow lines secured to the tow hooks and a second end attached to an object or another vehicle, the vehicle can move to pull on or move the object or to tow another vehicle. Thus, including tow hooks on a vehicle may prove convenient for various uses.

However, tow hooks that are mounted to the frame or body of a vehicle may present some disadvantages. For example, although vehicles may be designed to distribute and absorb energies resulting from a collision, a tow hook extending from the vehicle may result in an acutely localized force on the tow hook that may interfere with distribution of forces and energies incurred in a collision. Also, protruding tow hooks may result in damage to objects that the tow hooks may impact, whether those objects include stationary structures, other vehicles, or even bicycles and pedestrians.

BRIEF SUMMARY

Disclosed embodiments include apparatuses, vehicles, and methods for a displaceable tow hook.

In an illustrative embodiment, an apparatus includes a tow hook configured to extend in a first direction from a surface of a vehicle. The tow hook includes a receiving section configured be positioned to face in the first direction and to receive a towing line and a securing section configured to extend away from the receiving section. A positioning mount is configured to secure the tow hook to the surface of the vehicle. The positioning mount is configured to release the tow hook in response to application of an impinging force on the tow hook in excess of a predetermined threshold where the impinging force has a force component applied in at least one direction chosen from a second direction opposite to the first direction and a third direction transverse to the first direction. A load-bearing structure is configured to mechanically connect the securing section to a structural component of the vehicle. The tow hook and the load-bearing structure are configured to support a force having a component in the first direction that is at least equal to the towing weight of the vehicle.

In another illustrative embodiment, a vehicle includes a vehicle body. A cabin is incorporated in the vehicle body and configured to receive an operator. A drive system is supported by the vehicle body and configured to control one or more wheels of the vehicle to motivate, accelerate, decelerate, stop, and steer the vehicle. A tow hook includes a receiving section configured be positioned to face in the first direction and to receive a towing line and a securing section configured to extend away from the receiving section. A positioning mount is configured to secure the tow hook to the surface of the vehicle. The positioning mount is configured to release the tow hook in response to application of an impinging force on the tow hook in excess of a predetermined threshold where the impinging force has a force component applied in at least one direction chosen from a second direction opposite to the first direction and a third direction transverse to the first direction. A load-bearing structure is configured to mechanically connect the securing section to a structural component of the vehicle. The tow hook and the load-bearing structure are configured to support a force having a component in the first direction that is at least equal to the towing weight of the vehicle.

In a further illustrative embodiment, a method includes providing a tow hook at a surface of a vehicle. The tow hook includes a receiving section that extends in a first direction and is configured to receive a towing line and a securing section that extends away from the receiving section. The tow hook is displaceably mounted the to the surface, such that the tow hook is releasable from the surface in response to application of an impinging force on the tow hook in excess of a predetermined threshold and having a force component applied in at least one direction chosen from a second direction opposite to the first direction and a third direction transverse to the first direction. The securing section is mechanically joined to a structural component of the vehicle to support a force applied to the tow hook and having a component in the first direction that is at least equal to the towing weight of the vehicle.

Further features, advantages, and areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way. The components in the figures are not necessarily to scale, with emphasis instead being placed upon illustrating the principles of the disclosed embodiments. In the drawings:

FIG. 1 is a cutaway top-down view of a vehicle with displaceable tow hooks;

FIG. 2 is a side view in partial cutaway form of the vehicle of FIG. 1 with a displaceable tow hook;

FIGS. 6A-6C are top-down schematic views of the tow hook in the positioning mount of FIG. 3 being displaced by an impinging force;

FIGS. 7 and 8 are plan views of a tow hook secured to a structural component of a vehicle using a load-bearing structure in the form of a cable;

FIG. 9 includes a side view of an open-ended tow hook;

FIGS. 10A-10C are plan views of cables usable in the load-bearing structure of FIG. 7;

FIGS. 11A, 11B, and 12 are play views of mounts for securing the cable of FIG. 10 to a structural component of a vehicle;

FIGS. 15, 16A, and 16B are plan views of a tow hook using a load-bearing structure in the form of a deformable solid linkage.

DETAILED DESCRIPTION

Figure 3:
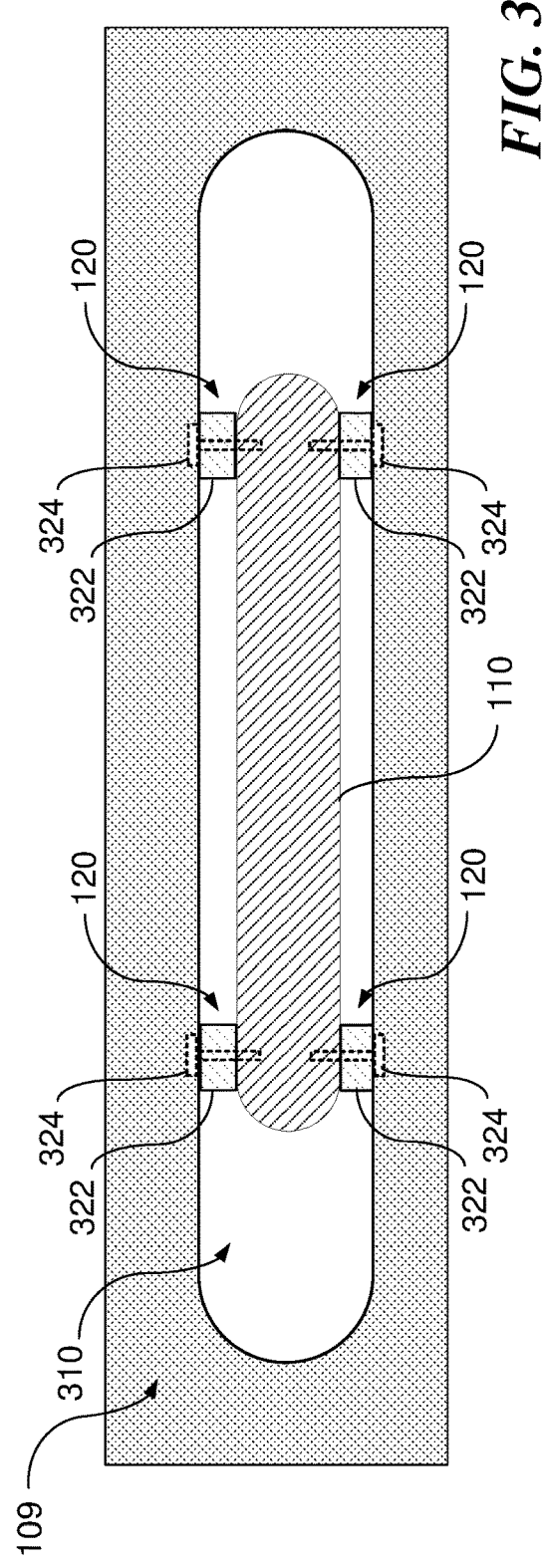
FIG. 3 is a front plan view of a tow hook in a positioning mount in a front surface of the vehicle of FIG. 1.

The following description is merely illustrative in nature and is not intended to limit the present disclosure, application, or uses. It will be noted that the first digit of three-digit reference numbers and the first two digits of four-digit reference numbers correspond to the first digit of one-digit figure numbers and the first two digits of two-digit figure numbers, respectively, in which the element first appears.

The following description explains, by way of illustration only and not of limitation, various embodiments of apparatuses, vehicles, and methods for using a displaceable tow hook on a vehicle.

By way of a non-limiting introduction and overview, in various embodiments a displaceable tow hook assembly enables a vehicle to tow or be towed, but allows a tow hook to be displaced in the event of an impact impinging upon the tow hook. The displaceable tow hook assembly includes a tow hook that is secured to a surface of the vehicle with a positioning mount. The positioning mount is configured to allow the tow hook to be displaced when a force directed toward or partially toward the vehicle impinges on the tow hook. However, the tow hook is secured to a structural component of the vehicle, such as the vehicle frame, with a load-bearing member. The load-bearing member will convey a pulling, towing force applied to the tow hook to the frame of the vehicle to enable the vehicle to be towed or to pull another vehicle or other object. Thus, the displaceable tow hook assembly enables the tow hook to function as a tow hook but permits the tow hook to be displaced to reduce damage that may result in response to an impact impinging upon the tow hook.

Now that a general overview has been given, details of various embodiments will be explained by way of non-limiting examples given by way of illustration only and not of limitation.

Referring to FIG. 1, a displaceable tow hook assembly 100 is mounted on a vehicle 101. In various embodiments, the displaceable tow hook assembly 100 includes a tow hook 110, a positioning mount 120, and a load-bearing member 130 that joins the tow hook 110 to a structural component of the vehicle 101, such as a frame 103 of the vehicle 101. In various embodiments, the load-bearing member 130 is coupled to a crossmember 105 of the frame 103. The vehicle 101 is equipped with four displaceable tow hook assemblies 101. Two displaceable tow hook assemblies 101 are disposed at a front end 111 of the vehicle 101, with the tow hooks 110 mounted to a front bumper 109 and coupled to a front structural frame member 105. Two other displaceable tow hook assemblies 101 are disposed at a rear end 113 of the vehicle 101, with the tow hooks 110 mounted to a rear bumper 119 and coupled to a rear structural frame member 107. Any number of displaceable tow hook assemblies 101 may be positioned on one end or both ends of the vehicle 101, as well as along sides of the vehicle 101 if desired. As in the example of FIG. 1, in various embodiments the tow hook 110 may include a closed-loop type hook. As also depicted in the example of FIG. 1, in various embodiments the tow hook 110 may be mounted horizontally, with the tow hook 110 coplanar with a surface on which the vehicle 101 may rest.

Referring additionally to FIG. 2, a vehicle 201 includes one or more tow hook assemblies 200 positioned only at a front end 211 of the vehicle 201. The tow hook assembly 200 includes an open tow hook 210, in contrast to the closed-loop tow hook 110 of the tow hook assembly 100 of FIG. 1. The tow hook assembly 200 also presents the tow hook 210 in a vertically-disposed orientation, transverse to a surface on which the vehicle 201 may rest. In contrast to the tow hook assemblies 100 of FIG. 1 that are mounted to the bumpers 109 and 119 of the vehicle 101 (FIG. 1), the tow hook assembly 200 is secured with a positioning mount 220 to a fascia of the vehicle 201 below a bumper 219. A load-bearing member 230 couples the tow hook 210 to a structural component of the vehicle 201, such as a frame 203.

Referring additionally to FIG. 2, in various embodiments the vehicle 201 also includes a vehicle body 221 that includes a cabin 231 or other compartment to receive an occupant or cargo. The vehicle 201 also may include a cargo area 241 separate from the cabin 231, such as a truck bed or a trunk. The vehicle 201 also includes a drive system 251 that operates in conjunction with one or more wheels 261 and 271 of the vehicle 201 to motivate, accelerate, decelerate, stop, and steer the vehicle 201.

As previously described, the tow hook may include a closed-loop tow hook 110 (FIG. 1) or an open tow hook 210 (FIG. 2). A tow hook assembly may include a horizontally-disposed tow hook 110, as used in the tow hook assembly 100 (FIG. 1) or a vertically-disposed tow hook 210, as used in the tow hook assembly 200 (FIG. 2). A tow hook assembly may be mounted on a bumper 109 or 119, as in the tow hook assembly 100 of FIG. 1, or may be mounted on another vehicle surface such as the fascia 209, as in the tow hook assembly 200 of FIG. 2. These attributes may be employed or combined as desired. For purposes of the foregoing description, the illustrative tow hook assembly 100, including a horizontally-disposed, closed-loop, bumper-mounted tow hook, is described by example given by way of illustration only and not by way of limitation.

Referring additionally to FIG. 3, the positioning mount 120 is mounted to position the tow hook 110 within a recess 310 defined by the front bumper 109 of the vehicle 101 (FIG. 1). As previously described, the tow hook assembly 100 may also be mounted to a rear bumper 119 (FIG. 1) or mounted on or relative to another surface of the vehicle.

The tow hook 110 is secured to the bumper 109 with one or more positioning mounts 120. In various embodiments, four positioning mounts 120 may be included at each of a top and bottom of the tow hook 110 and at each side of the tow hook 110. In various embodiments, two positioning mounts 120 may be used at each side of the tow hook 110. Further, a single positioning mount 120 may be used to secure the tow hook 110 within the recess 310 of the bumper 109.

In various embodiments, the positioning mounts 120 may include a mounting body 322 couplable to the bumper 109 and the tow hook 110 by a securing device 324 that includes a connector such as a pin, dowel, or bolt. In various embodiments, the mounting body 322 and/or the securing device 324 are configured to give way to allow the tow hook 110 to be displaced in response to the tow hook 110 being impinged upon by a force greater than a predetermined threshold. For example, the mounting body 322 and/or the securing device 324 may be configured to shear or crumble when a force greater than the predetermined threshold impinges upon the tow hook 110 and, thus, is imparted to the mounting body 322 and/or the securing device 324.

In various embodiments, the mounting body 322 may be a press-fit structure to frictionally secure the tow hook 110 within the recess 310 of the bumper 109 until a force greater than the predetermined threshold impinges upon the tow hook 110. In various embodiments, the mounting body 322 may include a portion of the bumper 109 that is formed to give way when impinged upon by a force greater than the predetermined threshold. Any structure may be used that holds the tow hook 110 in place relative to the bumper 109 until a force greater than the predetermined threshold is applied to the tow hook 110. In various embodiments, the recess 310 is sized to permit the tow hook 110 to be displaced inwardly and/or from side-to-side depending on whether a force impinges squarely upon a front surface of the tow hook 110 or whether the force includes a transverse component, as further described below.

Figure 4:
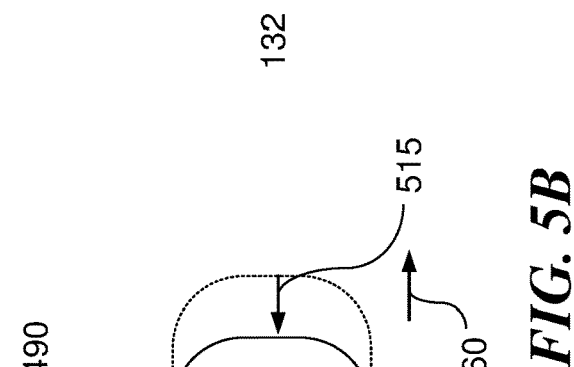
FIGS. 4, 5A, 5B are top-down schematic views of the tow hook in the positioning mount of FIG. 3 responding to a pulling force.

Referring additionally to FIG. 4, the tow hook 110 includes a receiving section 420 and a securing section 430 mounted, for example, to a surface 490 of a vehicle. Although the vehicle is not shown in FIGS. 4, 5A, and 5B, it will be appreciated that a relative movement of the surface 490 is representative of movement of the vehicle.

The receiving section 420 faces in a first direction 450 extending away from a vehicle on which the tow hook 110 is mounted. The receiving section 420 is configured to receive a tow line that may include a tow hook (not shown in FIG. 4). As previously described, the tow hook 110 may include a closed loop structure as shown or may include an open-ended tow hook 210 (FIG. 2) onto which a loop in a cable may be passed. The securing section 430 faces in a second direction 460 opposite to the first direction 450. The securing section 430 is configured to be engaged by a load-bearing structure, such as the load-bearing structure 130 (FIG. 1), to connect the securing section 430 to a structural component of the vehicle, such as the front structural frame member 105 of the vehicle 101 (FIG. 1).

Figure 5A:
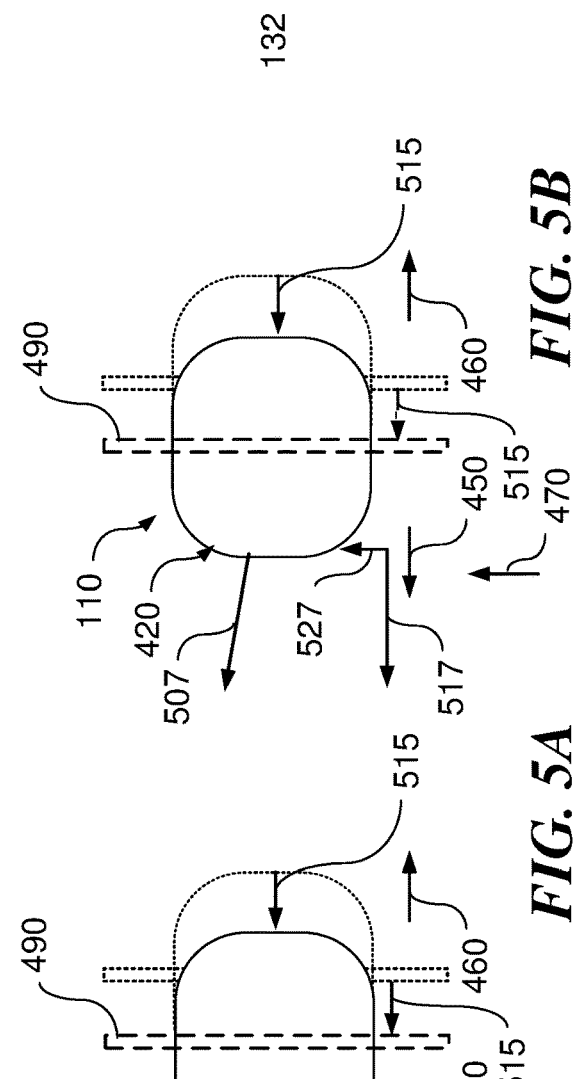

Referring additionally to FIG. 5A, a towing force 505 is applied on the receiving section 420 of the tow hook 110 by a tow line, tow cable, or other body (not shown in FIG. 5A) in the first direction 450. Because the tow hook 110 is secured to a structural component of the vehicle by the load-bearing member (not shown in FIG. 5A), application of the towing force 505 to the tow hook 110 moves both the tow hook 110 and the surface 490 through a distance 515. It will be appreciated that, if the vehicle is pulling another body, the towing force 505 will still be applied in the first direction and the tow hook 110 will be maintained in its position relative to the surface 490 while the surface 490 moves through a distance in the second direction 460.

Figure 5B:
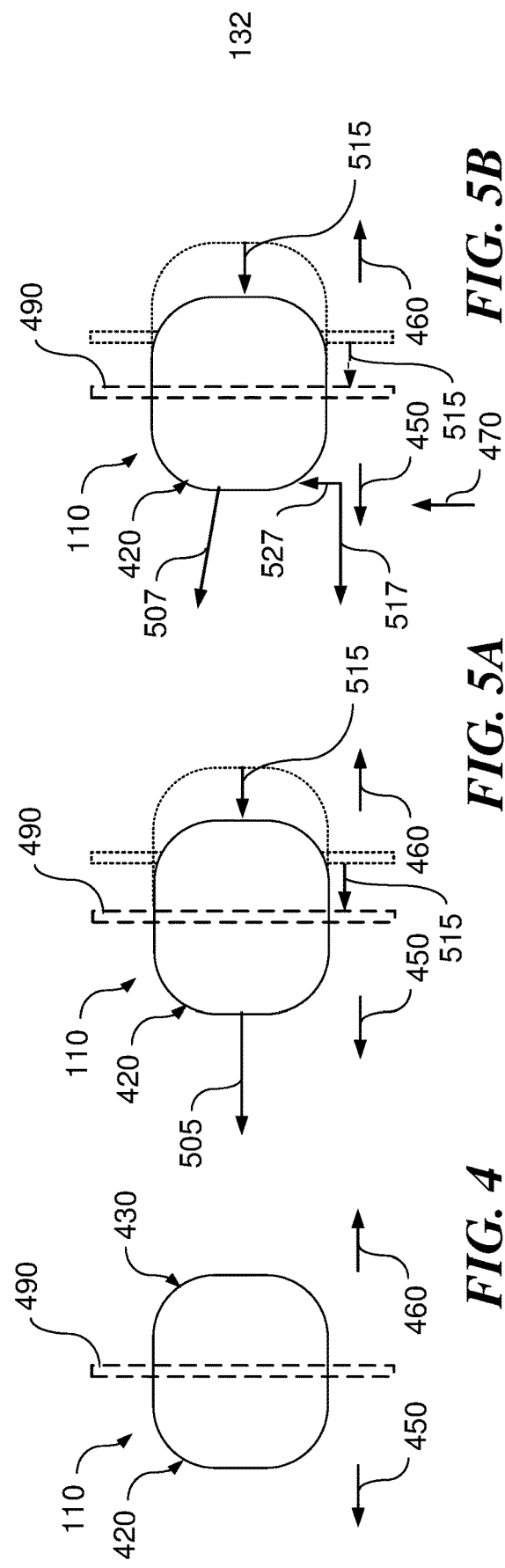

Referring additionally to FIG. 5B, an oblique towing force 507 is applied on the receiving section 420 of the tow hook 110 by a tow line, tow cable, or other body (not shown in FIG. 5B). The oblique towing force 507 has a first component 517 in the first direction 450 as well as a second component 527 in a third direction 470 that is transverse to the first direction 450. With the load-bearing member (not shown) securing the tow hook 110 to a structural component of the vehicle, application of the towing force 505 to the tow hook 110 moves both the tow hook and the surface 490 through a distance 515 (or in an opposite direction when the vehicle is pulling another body, as previously described). The positioning mount (not shown in FIG. 5B) may maintain the position of the tow hook 110 if the second component 527 of the oblique towing force 507 is less than a predetermined threshold. However, even if the positioning mount should give way as a result of the second component 527 of the oblique towing force 507, the load-bearing member still withstands the first component 517 of the oblique towing force 507. Therefore, the load-bearing member will still allow the vehicle to be towed or to pull another body.

In contrast to the tow hook 110 and the surface 490 moving in concert in response to application of the towing forces 505 and 507 of FIGS. 5A and 5B, respectively, when forces impinge upon the tow hook 110, the positioning mount 120 (FIGS. 1-3) allows the tow hook 110 to be displaced relative to the surface 490. Referring additionally to FIG. 6A, an impinging force 605 is applied in the second direction 460 opposite to the first direction 450 in which the towing force 505 of FIG. 5A was applied. The impinging force 605 displaces the tow hook 110. Specifically, the impinging force 605 causes the tow hook 110 to be released by the positioning mount (not shown in FIG. 6A) and to move through a distance 615 relative to and independently of the surface 490.

Referring additionally to FIG. 6B, in various embodiments the positioning mount (not shown in FIG. 6B) also enables the tow hook 110 to be displaced in response to a transverse force 607 impinging upon the tow hook 110. The transverse force 607 impinges upon the tow hook 110 in a fourth direction 670 transverse to the first direction 450 and the second direction 460. Specifically, the transverse force 607 causes the tow hook 110 to be released by the positioning mount (not shown in FIG. 6A) and to move through a distance 617 relative to and independently of the surface 490. Enabling displacement of the tow hook 110 in response to application of the transverse force 607 may help contribute to eliminating damage or injury to a vehicle, motorcycle, bicycle, or pedestrian that impacts the tow hook 110 in the transverse direction.

Referring additionally to FIG. 6C, in various embodiments the positioning mount (not shown in FIG. 6C) also enables the tow hook 110 to be displaced in response to an oblique force 609 impinging upon the tow hook 110. The oblique force 609 has a first component 619 in the second direction 460 as well as a second component 527 in the fourth direction 670. As a result of the oblique force 609 impinging upon the tow hook 110, the tow hook 110 is displaced a first distance 627 in the second direction 460 and a second distance 629 in the fourth direction 670 relative to and independent from the surface 490. The displacement of the tow hook 110 thus may help contribute to avoiding damage to the object that applies the oblique 609 force and/or allows the surface 490 to absorb and distribute a remainder of the oblique force 609.

By way of summary, as described with reference to FIGS. 6A-6C, in various embodiments the positioning mount 120 enables displacement of the tow hook 110 in response to an impinging force on the tow hook 110 to potentially avoid damage that may be caused by the tow hook 110 on an object impacting the tow hook 110. However, as previously described with reference to FIGS. 5A and 5B, the load-bearing member 310 coupled with a structural component of the vehicle enables the tow hook 110 to withstand a pulling force to allow the towing hook 110 to allow the vehicle to tow or to be towed.

Referring additionally to FIG. 7, in various embodiments a displaceable tow hook assembly 710 includes a load-bearing member in the nature of a cable 750. The cable 750 extends between a hook coupling 732 disposed on the securing section 430 of the tow hook 110 and a frame coupling 734 disposed on a structural component of the vehicle (not shown in FIG. 7), such as the crossmember 105. In various embodiments, the cable 750 includes a dual-stranded cable or loop that is looped around or otherwise coupled to the hook coupling 732 and the frame coupling 734 and extending therebetween. In various embodiments, the cable 750 may include a single strand (not shown) coupled to and extending between the hook coupling 732 and the frame coupling 734. The cable 750 includes a generally inextensible cable.

When a pulling force 701 is exerted in (or having a component along) the first direction 450, the pulling force 701 is applied to the receiving section 420 of the tow hook 110. As a result, the pulling force 701 is exerted on the securing section 430 and the hook coupling 732. The cable 750 exerts the pulling force 701 on the frame coupling 734 and, thus, on the crossmember 105. As a result, the pulling force allows the vehicle to pull or be pulled as a result of the application of the pulling force 701 to the tow hook 110. As previously described, when the pulling force 701 is applied to the tow hook 110, the tow hook 110 and the surface 490 of the vehicle move in concert.

Referring additionally to FIG. 8, an impinging force 801 is applied to the receiving section 420 of the tow hook 110 in (or having a component along) the second direction 460. As previously described, when the impinging force 801 exceeds a predetermined threshold, a positioning mount (not shown in FIG. 8) allows the tow hook 110 to be displaced in the second direction relative to the surface 490 of the vehicle. Because the tow hook 110 is joined by the cable 750 to the crossmember 105, displacement of the tow hook 110 caused by the impinging force 801 is not resisted or is only minimally resisted by the cable 750 which may reduce damage to the vehicle or a body impacting the tow hook 110.

As previously described with reference to FIGS. 6B and 6C, a transverse impinging force or an impinging force with a transverse component also may cause the tow hook 110 to be displaced transversely. It will be appreciated that a transverse or partially transverse movement of the tow hook 110 also will not be opposed by the cable 750 or will only be minimally opposed by the cable 750, thereby potentially reducing damage to the vehicle or a body impacting the tow hook 110.

In various embodiments, the cable 750, as well as the tow hook 110, the hook coupling 732, the frame coupling 734, and the crossmember 105 all are capable of withstanding a pulling force 701 that is at least equivalent to the gross towing weight of the vehicle.

Referring additionally to FIG. 9, in accordance with various embodiments, a tow hook 910 may be open-ended, as described with reference to FIG. 2, instead of closed-ended, as in the example of the tow hook 110. The tow hook 910 may be mounted in a vertically-disposed orientation, transverse to a surface on which the vehicle (not shown in FIG. 9) may rest, as described with reference to FIG. 2. The tow hook 910 also may be mounted in a horizontally-disposed orientation, with the tow hook 910 coplanar with a surface on which the vehicle may rest. The tow hook 910 may be secured at a front end of the vehicle via a positioning mount which secures the tow hook 910 in place using a securing device, a press-fit structure, on another mechanism as previously described until it is displaced in response to the tow hook 910 being impinged upon by a force greater than a predetermined threshold.

Analogous to the closed-ended tow hook 110, the tow hook 910 includes a receiving section 920 and a securing section 930. The receiving section 920 faces in the first direction 450 extending away from a vehicle on which the tow hook 910 is mounted. The receiving section 920 is configured to receive a tow line that may include a tow hook or a closed loop (not shown in FIG. 9). The securing section 930 faces in the second direction 460 opposite to the first direction 450. The securing section 930 is configured to be engaged by a load-bearing structure, such as the load-bearing structure 230 (FIG. 2), to connect the securing section 930 to a structural component of the vehicle, such as the frame 203 of the vehicle 201 (FIG. 2). The securing section 930 may include a coupling 995, such as an opening, a notch, or a protrusion, to engage the load bearing structure. The tow hook 910 may include support members 990 configured to engage securing devices 924 that hold the tow hook 910 in place until impinged upon by a displacing force. The tow hook 910 is configured to receive and respond to towing forces or impinging forces as previously described with reference to FIGS. 5A, 5B, 6A-C, 7, and 8.

In various embodiments, the cable 750 of FIGS. 7 and 8 may include a number of different cable structures. Referring additionally to FIG. 10A, the cable 750 may include an extruded or monofilament cable 1052, comprised of metal or another material of suitable tensile strength. Referring additionally to FIG. 10B, the cable 750 may include a multifilament or woven cable 1054. A multifilament or woven cable 1054 may include filaments or strands formed of metal or another flexible material with a suitable tensile strength. Referring additionally to FIG. 10C, the cable 750 may be comprised of a carbon fiber cable 1056 which may include a monofilament or woven cable. As previously stated, the cable 750, as a whole, should be able to withstand a tension of at least the gross towing weight of the vehicle. Thus, for example, a single-element cable would have to withstand a tension equivalent to at least the full gross towing weight of the vehicle. By contrast, in a multi-element cable or looped cable, such as the cable 750 (FIGS. 7 and 8), in total, the members of the cable would have to withstand at least the full gross towing weight of the vehicle.

The cable or other load-bearing member may be secured to the frame or other structural component of the vehicle in a number of ways. Referring additionally to FIG. 11A, for example, a mount 1110 may be formed into or fixedly attached to the frame or other structural member 1105 of the vehicle (not shown in FIGS. 11A-C). The mount may include a receiving structure 1112 to engage the cable or load-bearing member, such as an opening, a notch, or a protrusion to which the cable or load-bearing member is coupled.

Referring additionally to FIG. 11B, for example, the receiving structure 1112 is an opening through which a cable 1130 passes. The mount 1105 may be formed into or fix ably attached to the frame or other structural member 1105 directly and/or the mount may include an attachment structure 1120, such as a bracket, to facilitate attachment of the mount to the frame or other structural member 1105.

Referring additionally to FIG. 12, in various embodiments, a mount 1210 may include multiple engagement structures 1211 and 1212 that each include a receiving structure 1213 and 1214, respectively, such as an opening. In this arrangement, a coupling 1220, such as a pin, dowel, or bolt, is inserted through the receiving structures 1213 and 1214 and the cable 1130 is then looped around the coupling 1120 to secure the cable to the mount 1210. The mount 1210 also may include an attachment structure 1220, such as a bracket, to facilitate attachment of the mount to the frame or other structural member 1105.

Figure 13:
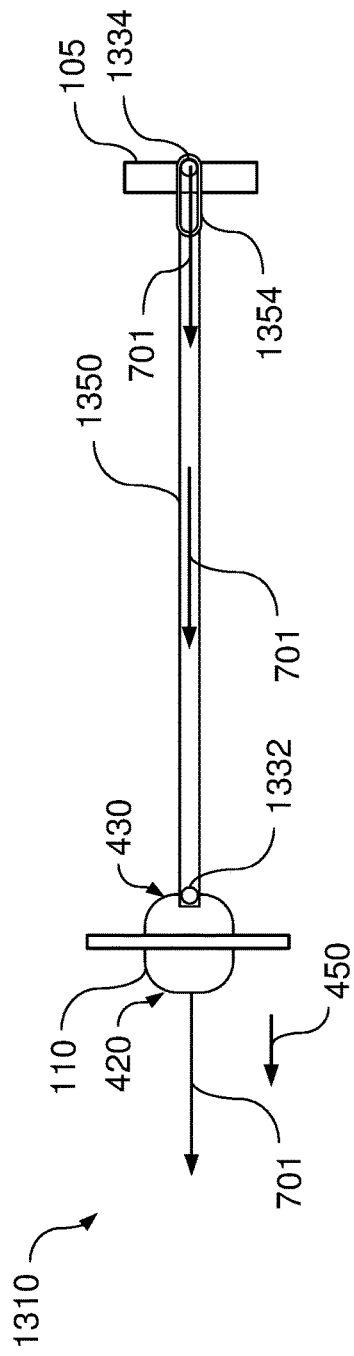
FIGS. 13, 14A, and 14B are plan views of a tow hook using a load-bearing structure in the form of a solid linkage releasable from the structural component of a vehicle in response to an impact.

Referring additionally to FIG. 13, in various embodiments a displaceable tow hook assembly 1310 includes a load-bearing member in the nature of a solid linkage 1350. The linkage 1350 extends between a hook coupling 1332 disposed on the securing section 430 of the tow hook 110 and a frame coupling 1334 disposed on a structural component of the vehicle (not shown in FIG. 13), such as the crossmember 105. In various embodiments, the linkage 1350 may be coupled to frame coupling 1334 with a slidable coupling 1354.

When the pulling force 701 is applied to the tow hook 110 in (or having a component along) the first direction 450, the pulling force 701 is applied to the receiving section 420 of the tow hook 110. As a result, the pulling force 701 is exerted on the securing section 430 and the hook coupling 732. The linkage 1350 applies the pulling force 701 to the frame coupling 1034 and, thus, to the crossmember 105. As a result, the pulling force allows the vehicle to pull or be pulled as a result of the application of the pulling force 701 to the tow hook 110. As previously described, when the pulling force 701 is applied to the tow hook 110, the tow hook 110 and the surface 490 of the vehicle move in concert.

Figure 14A:
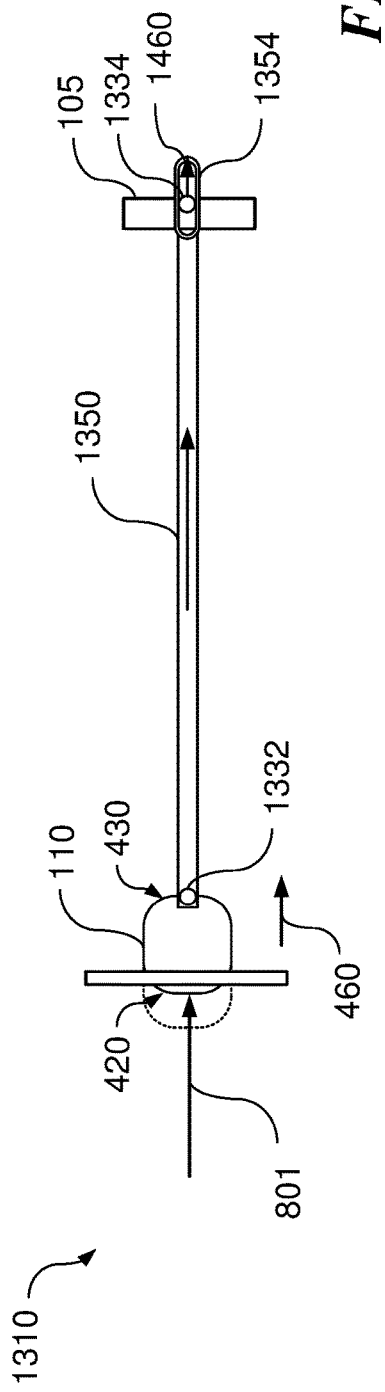

Referring additionally to FIG. 14A, the impinging force 801 is applied to the receiving section 420 of the tow hook 110 in the second direction 460. As previously described, when the impinging force 801 exceeds a predetermined threshold, a positioning mount (not shown in FIG. 14A) allows the tow hook 110 to be displaced in the second direction relative to the surface 490 of the vehicle. The tow hook 110 is joined to the crossmember 105 with the slidably-mounted linkage 1350. Thus, while the tow hook 110 may apply the impinging force 801 to the linkage 1350, the slidable coupling 1354 slides relative to the to the frame mount 1034. As a result, the linkage 1350 does not resist or only minimally resists displacement of the tow hook 110 in response to application of the impinging force 810. The displacement of the tow hook 110 thus may reduce damage to the vehicle or a body impacting the vehicle in a collision.

Figure 14B:
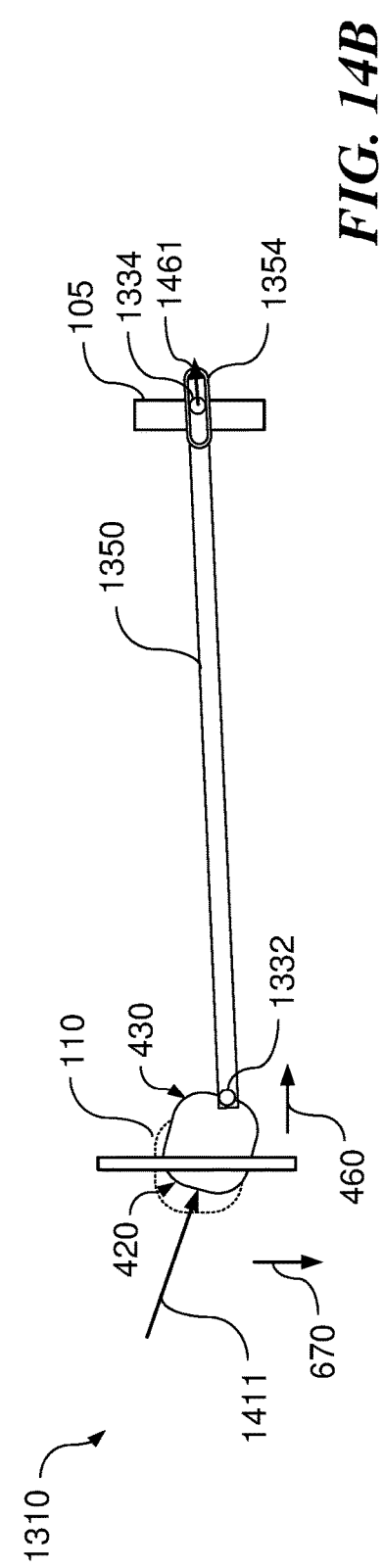

Referring additionally to FIG. 14B, an oblique impinging force 1411 is applied to the receiving section 420 of the tow hook 110. The oblique impinging force 1411 has components in the second direction 460 and in the fourth direction 670. As previously described, when the impinging force 1411 exceeds a predetermined threshold, a positioning mount (not shown in FIG. 11B) allows the tow hook 110 to be displaced in the second direction 460 and in the fourth direction 670 relative to the surface 490 of the vehicle. In various embodiments, the hook mount 1332 is pivotably coupled to the linkage 1050. As a result, sliding of the slidable coupling 1054 of the linkage 1350 and pivoting of the linkage at the hook mount 1332 allow the linkage 1350 to be displaced by the tow hook 110. Thus, while the tow hook 110 may at least partially apply the impinging force 1411 to the linkage 1350, because the linkage 1350 moves, the linkage 1350 does not resist or only minimally resists displacement of the tow hook 110 in response to application of the impinging force 1411. The displacement of the tow hook 110 thus may reduce damage to the vehicle or a body impacting the vehicle in a collision.

Referring additionally to FIG. 15, in various embodiments a displaceable tow hook assembly 1510 includes a load-bearing member in the nature of a deformable solid linkage 1550. The linkage 1550 extends between a hook coupling 1532 disposed on the securing section 430 of the tow hook 110 and a frame coupling 1534 disposed on a structural component of the vehicle (not shown in FIG. 15), such as the crossmember 105. In various embodiments, the linkage 1350 may be fixedly or pivotably coupled to frame coupling 1534.

When the pulling force 701 is applied to the tow hook 110 in (or having a component along) the first direction 450, the pulling force 701 is applied to the receiving section 420 of the tow hook 110. As a result, the pulling force 701 is exerted on the securing section 430 and the hook coupling 732. The linkage 1550 applies the pulling force 701 to the frame coupling 1534 and, thus, to the crossmember 105. As a result, the pulling force allows the vehicle to pull or be pulled as a result of the application of the pulling force 701 to the tow hook 110. As previously described, when the pulling force 701 is applied to the tow hook 110, the tow hook 110 and the surface 490 of the vehicle move in concert.

Referring additionally to FIG. 16A, the impinging force 801 is applied to the receiving section 420 of the tow hook 110 in the second direction 460. As previously described, when the impinging force 801 exceeds a predetermined threshold, a positioning mount (not shown in FIG. 14A) allows the tow hook 110 to be displaced in the second direction relative to the surface 490 of the vehicle. The tow hook 110 is joined to the crossmember 105 with the deformable solid linkage 1550. Thus, while the tow hook 110 may apply the impinging force 801 to the linkage 1550, the linkage 1550 crumples or otherwise deforms at one or more locations 1690 to allow the tow hook 110 to be displaced relative to the crossmember 105 or other structural component of the vehicle. In various embodiments, the one or more locations 1690 may include designated crumple zones that are configured to deform more readily than other portions of the linkage 1550 as a result of a relative thickness, scoring, different heat treating, or other treatment of the one or more locations 1690.

Referring additionally to FIG. 16B, instead of the deformable solid linkage 1550 crumpling, the linkage 1550 may bend transverse to its length at a point 1695. The bending at the point 1695 would similarly allow the tow hook 110 to be displaced relative to the crossmember 105 or other structural component of the vehicle. Although FIG. 16A depicts a direct impinging force 810 and FIG. 16B depicts an oblique impinging force 1411, crumpling or bending of the linkage 1550 would enable displacement of the tow hook 110 relative to the crossmember 105 or other structural component of the vehicle.

Figure 17:
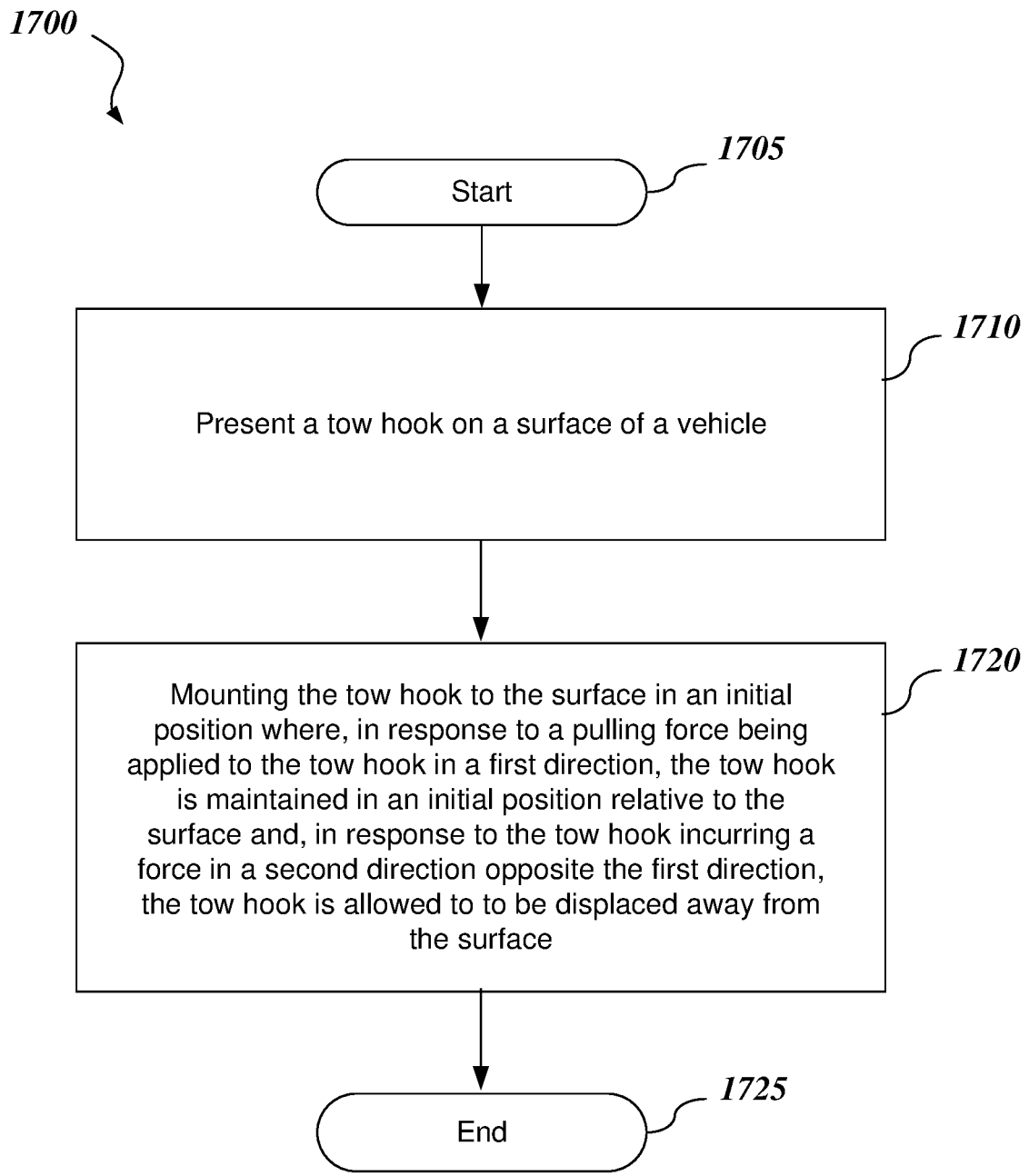
FIG. 17 is a flow chart of an illustrative method of displaceably mounting a tow hook to a surface of a vehicle.

Referring additionally to FIG. 17, an illustrative method 1200 of displaceably mounting a tow hook on a vehicle is provided. The method 1700 starts at a block 1705. At a block 1710, a tow hook is presented on a surface of a vehicle. At a block 1720, the tow hook is mounted to the surface in an initial position where, in response to a pulling force being applied to the tow hook in a first direction, the tow hook is maintained in an initial position relative to the surface and, in response to the tow hook incurring a force in a second direction opposite the first direction, the tow hook is allowed to be displaced away from the surface. The method 1700 ends at a block 1725.

In some instances, one or more components may be referred to herein as "configured to," "configured by," "configurable to," "operable/operative to," "adapted/adaptable," "able to," "conformable/conformed to," etc. Those skilled in the art will recognize that such terms (for example "configured to") generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (for example, "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (for example, the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (for example, " a system having at least one of A, B, and C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

It will be appreciated that the detailed description set forth above is merely illustrative in nature and variations that do not depart from the gist and/or spirit of the claimed subject matter are intended to be within the scope of the claims. Such variations are not to be regarded as a departure from the spirit and scope of the claimed subject matter.

What is claimed is:

1. An apparatus comprising:
a tow hook configured to extend in a first direction from a surface of a vehicle, the tow hook including:
a receiving section configured be positioned to face in the first direction and to receive a towing line; and
a securing section configured to extend away from the receiving section;
a positioning mount configured to secure the tow hook to the surface of the vehicle and to release the tow hook in response to application of an impinging force on the tow hook in excess of a predetermined threshold and having a force component applied in at least one direction chosen from a second direction opposite to the first direction and a third direction transverse to the first direction; and
a load-bearing structure configured to mechanically connect the securing section to a structural component of the vehicle, the tow hook and the load-bearing structure being configured to support a force having a component in the first direction that is at least equal to the towing weight of the vehicle, wherein the load-bearing structure includes a linkage configured to mechanically join the securing section of the tow hook to the structural component of the vehicle, the linkage being further configured to withstand a tension that is at least equal to the towing weight of the vehicle, wherein the linkage is chosen from a solid linkage configured to permit movement of the tow hook in response to application of the impinging force by a reaction chosen from the solid linkage being released from the structural component of the vehicle by the linkage and the solid linkage being deformed and a cable chosen from a monofilament cable and a stranded cable.

2. The apparatus of claim 1, wherein the positioning mount includes a recess in a front surface of the vehicle.

3. The apparatus of claim 2, wherein the front surface includes at least one surface chosen from a bumper and a lower front fascia of the vehicle adjacent the bumper.

4. The apparatus of claim 1, wherein the linkage includes a coupling configured to be secured to a vehicle coupling on the structural component of the vehicle.

5. The apparatus of claim 1, wherein the cable includes at least one material chosen from a metal and a carbon fiber.

6. The apparatus of claim 1, wherein the structural component of the vehicle includes a frame of the vehicle.

7. A vehicle comprising:
a vehicle body;
a cabin incorporated in the vehicle body and configured to receive an operator;
a drive system supported by the vehicle body and configured to control one or more wheels of the vehicle to motivate, accelerate, decelerate, stop, and steer the vehicle;
a tow hook configured to extend in a first direction from a surface of the vehicle, the tow hook including:
a receiving section configured be positioned to face in the first direction and to receive a towing line; and
a securing section configured to extend away from the receiving section and to support a towing weight of the vehicle;
a positioning mount configured to secure the tow hook to the surface of the vehicle and to release the tow hook in response to application of an impinging force on the tow hook in excess of a predetermined threshold and having a force component applied in at least one direction chosen from a second direction opposite to the first direction and a third direction transverse to the first direction; and a load-bearing structure configured to mechanically connect the securing section to a structural component of the vehicle, the tow hook and the load-bearing structure being configured to support a force having a component in the first direction that is at least equal to the towing weight of the vehicle, wherein the load-bearing structure includes a linkage configured to mechanically join the securing section of the tow hook to the structural component of the vehicle, the linkage being further configured to withstand a tension that is at least equal to the towing weight of the vehicle, wherein the linkage is chosen from a solid linkage configured to permit movement of the tow hook in response to application of the impinging force by a reaction chosen from the solid linkage being released from the structural component of the vehicle by the linkage and the solid linkage being deformed and a cable chosen from a monofilament cable and a stranded cable.

8. The vehicle of claim 7, wherein the positioning mount includes a recess in a front surface of the vehicle.

9. The vehicle of claim 8, wherein the front surface includes at least one surface chosen from a bumper and a lower front fascia of the vehicle adjacent the bumper.

10. The vehicle of claim 7, wherein the linkage includes a coupling configured to be secured to a vehicle coupling on the structural component of the vehicle.

11. The vehicle of claim 7, wherein the cable includes at least one material chosen from a metal and a carbon fiber.

12. The vehicle of claim 7, wherein the structural component of the vehicle includes a frame of the vehicle.

13. A method comprising:

providing a tow hook at a surface of a vehicle, the tow hook including a receiving section that extends in a first direction and is configured to receive a towing line and a load section that extends away from the receiving section and is configured to support a towing weight of the vehicle;

displaceably mounting the tow hook to the surface, wherein the tow hook is releasable from the surface in response to application of an impinging force on the tow hook in excess of a predetermined threshold and having a force component applied in at least one direction chosen from a second direction opposite to the first direction and a third direction transverse to the first direction; and mechanically joining the load-bearing structure to a structural component of the vehicle configured to support a force having a component in the first direction that is at least equal to the towing weight of the vehicle, wherein the load-bearing structure of the tow hook is mechanically joined to the structural component of the vehicle with a cable configured to withstand a tension that is at least equal to the towing weight of the vehicle.

\* \* \* \* \*